Jan. 16, 1968     N. SHIFRIN     3,363,503
MICRO-VOLUME SAMPLE CELLS
Filed Oct. 7, 1963
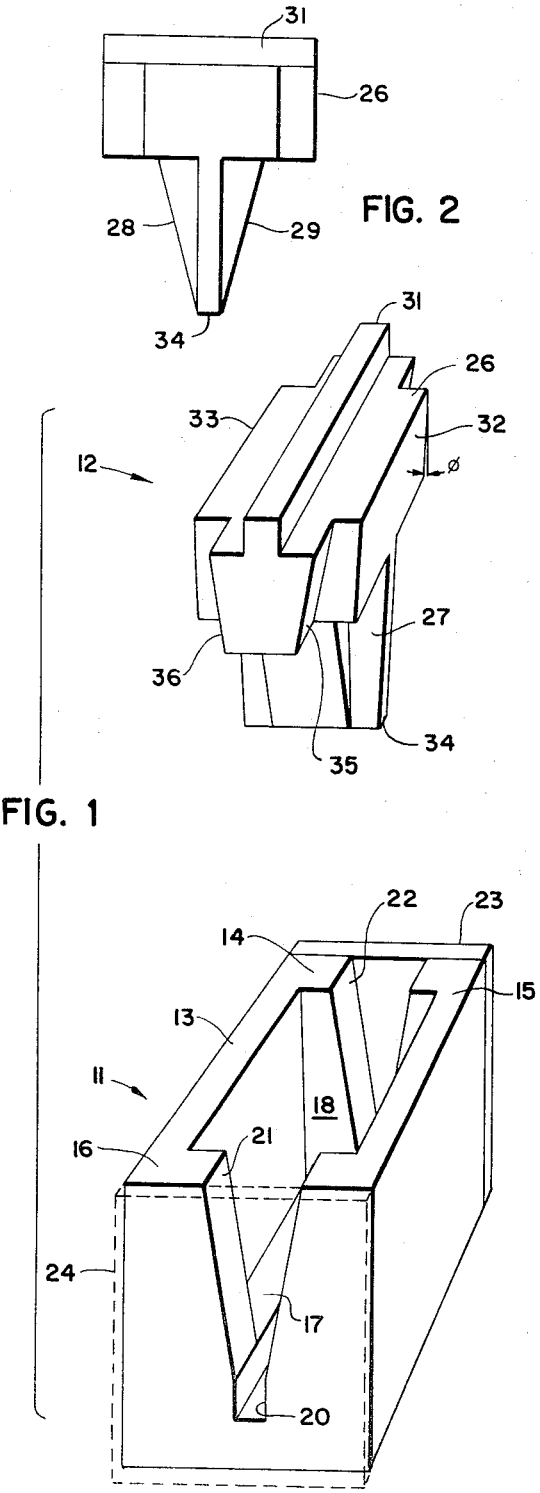
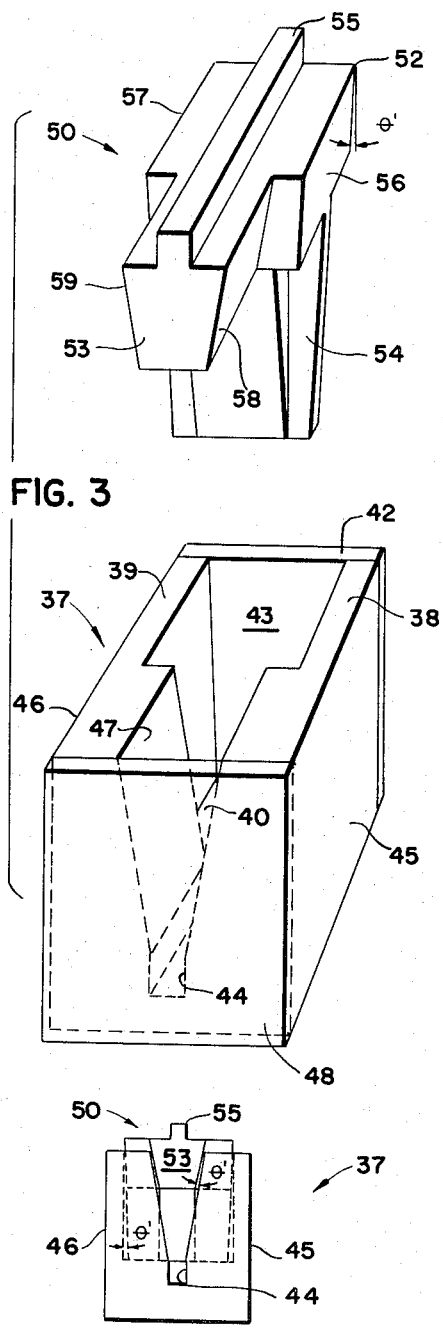
INVENTOR.
NORMAN SHIFRIN
BY
*Paul L. Harder*
ATTORNEY United States Patent Office 3,363,503
Patented Jan. 16, 1968

3,363,503
MICRO-VOLUME SAMPLE CELLS
Norman Shifrin, Whittier, Calif., assignor to Beckman Instruments, Inc., a corporation of California
Filed Oct. 7, 1963, Ser. No. 314,200
8 Claims. (Cl. 88—14)

ABSTRACT OF THE DISCLOSURE

A micro-volume sample cell for spectroscopic analysis and the like is disclosed. The cell generally consists of a body portion having a channel extending therethrough for receiving a sample and an insert having a wall portion seating against the channel whereby the confines of the channel and the wall portion define the optical beam path. The cell body is sealed with windows and, if desired, may be provided with a V-shaped slot terminating in the channel for filling of the cell. The insert may be constructed in such a manner that a small acute angle is formed between the outer edge thereof and the interior of the body to reduce capillary action of the sample. The body portion and insert are made of a material opaque to radiation over the desired wavelength range whereby the cell may be utilized without the necessity of beam condensers or external apertures.

---

This invention relates generally to sample cells for spectroscopy analysis and the like and more particularly to a micro-volume sample cell for liquid and volatile liquid vapor samples having a volume as small as 50 μl. wherein the cell block forms the optical mask which defines the cross-sectional area of the radiation beam passing from the source of radiation through the sample to the detector.

As is well known, the absorption of a sample is a function of its path length. It is apparent that in order to maintain a "standard path length" of 10 mm. in a micro-volume sample the cross-sectional area of the sample must be substantially reduced. Typically, the percentage of absorption of the micro-volume sample compared to that of larger volumes is small therefore extraneous radiation reaching the detector causes a reduction in sensitivity that is not ordinarily experienced with standard volume samples. It is therefore important to insure that the radiation reaching the detector is only that radiation which traverses the sample.

In the past, micro-volume cells have either ignored the micro aperture problem or have used externally placed apertures. If the aperture is neglected, a large percentage of the radiation is passed from the source to the detector which does not encounter the sample resulting in incomplete data inasmuch as the base line value is not a true constant due to absorption by the cell material and other absorbing media, such as the atmosphere or vapor phases of the sample, within the cell in areas devoid of sample. The external aperture has the problem of accurate alignment with the sample volume and if not placed extremely close to the sample does not truly limit the size in a divergent beam. This also superimposes absorptions of cell material, the atmosphere and vapor phase and scattering losses onto the sample's spectral absorption which culminate to increase errors and uncertainty in the resultant measurements.

Other present micro-volume cells have been arranged in such a manner so as to require syringes for the introduction of the sample or are filled by capillary action which requires considerable time and results in uncertainty due to the entrapment of bubbles. In the past capillary filled cells have generally been constructed with a very short path length which greatly limits the detectivity provided by the sample path. Such cells are difficult to clean, expensive to manufacture and complex of construction.

A principal object of this invention is to provide a micro-volume sample cell which may be utilized in spectroscopic analysis or the like without the necessity of externally aperturing the radiation beam path.

Another object is the provision of a micro-volume sample cell which may be readily filled with a standard pipette, which may be readily cleaned or disassambled and which presents a given volume within the area traversed by the beam so long as a minimum volume of sample is introduced into the cell.

Another object is the provision of a micro-volume sample cell for liquid samples which is simple of manufacture, inexpensive, provides a high degree of repeatability from sample to sample and cell to cell.

To accomplish the foregoing objects the invention generally contemplates a micro-volume sample cell block having an aperture extending therethrough which forms the sample channel. The cell block is constructed of a material opaque to radiation from the ultra-violet to the near-infrared spectral region and in which the cell block itself serves as a defining aperture for the excitation radiation beam. In this way no external or internal apertures are needed and no extraneous radiation is passed through cell areas devoid of sample thus yielding at the detector only radiation which has passed directly through the sample.

Other novel details of construction and arrangement of parts and other objects and attendant advantages of the present invention will be more readily appreciated as the same becomes better understood by reference to the following detailed description when considered in connection with the accompanying drawing in which like reference numerals designate like parts throughout the several figures thereof and wherein:

FIG. 1 is an exploded perspective view of one preferred embodiment of the invention;
FIG. 2 is a side view of the stopper or insert of FIG. 1;
FIG. 3 is an exploded perspective view of a second preferred embodiment of the invention; and
FIG. 4 is a front view of the embodiment of FIG. 3 in its assembled form.

Referring now to FIG. 1 there is illustrated one illustrative preferred embodiment of the invention wherein the cell block is formed by a cell body and a stopper or insert respectively indicated generally by the reference numerals 11 and 12. The cell body 11 is of unitary construction and has five side walls 13–17. The inner faces of side walls 13–17 define five sides of an open cavity 18. Side wall 17 has an aperture or groove 20 cut along the inner face thereof extending from the outer face of side wall 14 to the outer face of side wall 16. Side wall 16 has a V-shaped slot 21 formed therein with the narrowed portion of the slot terminating at the side walls of aperture 20 and the widened portion terminating at the upper edge of side wall 16 as viewed in FIG. 1. A similar V-shaped slot 22 is formed in side wall 14. The outer faces of side walls 14 and 16 may be highly polished to an optical flatness which may be of the order of three fringes. V-shaped slots 21 and 22 are provided for filling of the cell from a pipette or any other suitable means.

Transparent windows 23 and 24 are also highly polished to an optical flatness of approximately three fringes and are secured by any suitable means to the outer faces of side walls 14 and 16, window 24 having been shown in phantom for the sake of clarity. Windows 23 and 24 thus close and seal the ends of aperture 20 and V-shaped grooves 21 and 22 along the outer face of side walls 14 and 16.

Stopper or insert 12 has an upper portion 26 having an outer configuration substantially the same as cavity 18 and V-shaped slots 21 and 22 and a lower projecting portion formed by a thin wall member 27 extending across the entire width of the stopper or insert and which is strengthened by wedge-shaped members 28 and 29 as best illustrated in FIG. 2. A projecting portion 31 formed in the upper outer face of upper portion 26 may be grasped to aid insertion and removal of the insert from the cavity. The upper portion 26 of insert 12 is dimensioned in such a manner so as to fit snugly into cavity 18 of cell body 11 and the insert may, if desired, be made of unitary construction. Opposite side walls 32 and 33 formed by the outer faces of the upper portion 26 and the edges of projecting member 27 which lie adjacent the inner faces of side walls 13 and 15 of cell body 11 form a small acute angle $\phi$, such, for example, as 2°, with the adjacent inner faces. This small acute angle provides a widened spacing between the walls nearest the lower end of cavity 18 and together with the narrowed projecting member 27 decreases the tendency of capillary action of the sample between the inner faces of the cell body 11 and the outer faces of insert 12. Outer face 34 of the projecting member 27 seats on the inner face of side wall 17 and defines with the aperture 20 the sample channel. It is apparent that as insert 12 is seated into cavity 18 any sample which is in excess of that required to fill the sample cell will be displaced by the lower portion of projecting member 27 onto the inner face of side wall 17. It is also apparent that the projecting member 27 could be made so as to entirely fill cavity 18 and any excess sample would be displaced into V-shaped grooves 21 and 22. However, by making the lower portion of insert 12 as a thin walled projecting member such as 27 the area of contact between the sample and the insert is greatly decreased which maintains the tendency of any capillary action to a minimum. The outer faces 35 and 36 of the V-shape projecting portion of upper portion 26 also form a small acute angle with the outer faces of V-shaped slot 21. The outer faces of the V-shaped portion fitting into V-shaped slot 22 are formed in a similar manner.

The cell body 11 and insert 12 may advantageously be formed of a material which is opaque over the spectral region to which the sample is to be subjected. If the area of the cell is larger than the area of the radiation beam to which the sample is to be subjected the cell block operates as a mask between the radiation source and the detector and only that radiation impinging upon the cross-sectional area of the sample as defined by aperture 20 and the outer face of projecting portion 27 of insert 12 passes from the source to the detector. In this way no other mask or apertures need be utilized. By removal of insert 12 the cell may be readily cleaned by any suitable means.

The type of material utilized for the cell body 11 and the insert 12 is not critical although it should preferably be chemically inert to the samples to be utilized and is determined only by the desired degree of opacity and, insofar as cell body 11 is concerned, the manner in which windows 23 and 24 are to be sealed to the outer faces of side walls 14 and 16. For example, if windows 23 and 24 are to be formed of fused silica glass or quartz and fused to the cell body 11, then the cell body must be formed of an opaque low expansion glass having the same temperature coefficient as windows 23 and 24. Applicant has found that fused silica or quartz windows may readily be fused to an opaque black glass designated Corning No. X-790-AR manufactured by Corning Glass Works of Corning, N.Y. Applicant has also found that a one-half millimeter polished sample of this glass exhibits no detectable transmission of radiation greater than 0.05% over the entire spectral region from approximately 175 m$\mu$-3$\mu$, that is, from the ultra-violet to the near-infrared region of the spectrum. Applicant has further found it advantageous to form the insert 12 of black fluorocarbon resin, such as black Teflon, because of the non-wetting characteristics thereof thus even further decreasing the tendency for capillary action of the sample between the inner faces of cell body 11 and the outer faces of insert 12.

It is obvious that the windows may be clamped to the cell body by any suitable mechanical means. In such a case, it is not necessary that the cell body have the same temperature coefficient of expansion as the windows. Where this requirement is not present black Vitrolite or black Carrara have been found to be suitable material for the cell body although the degree of opacity is somewhat inferior to that of the aforementioned Corning glass.

One embodiment of a mechanical clamping means which may be conveniently utilized takes the form of a tightly fitted thin metallic band around the cell block and windows, the band having an aperture aligned with the sample channel or aperture 20 and generally of larger cross-sectional area. The band may be slipped over the windows and the cell block and may be further tightened by the insertion of respective pairs of wedge-shaped blocks between the inner side of the band and the outer face of side walls 13 and 15.

Referring now to FIGS. 3 and 4 there is illustrated an alternative illustrative embodiment of a micro-volume sample cell constructed after the teachings of this invention. In this embodiment cell body 37 has three integrally formed side walls 38–40. Transparent window 42 secured by any suitable means to the edges of side walls 38 and 39 forms the fifth side of a cavity 43. Side walls 39 and 40 are somewhat thicker at one end thereof and form the opposite outer faces 45, 46 and 41. Sample channel or aperture 44 is formed along the inner face of side wall 40 and extends through the widened portion of side walls 39 and 40 to the outer faces thereof. Side walls 39 and 40 have one half of a V-shaped slot 47 formed in the widened portion thereof with the narrow portion of the slot terminating at the side walls of aperture 44 and the widened portion terminating at the upper edge of side walls 39 and 40 as viewed in FIG. 3. Transparent windows 42 and 48 are secured to opposite outer faces of the cell body by any suitable means and seal sample channel 44 at the opposite ends thereof, window 42 also forming one side wall of cavity 43 and window 48 sealing the V-shaped slot 47.

Insert 50 may conveniently be formed as a unitary insert and comprises a first upper portion 52 having an external configuration substantially identical to that of cavity 43 and a second upper portion 53 having an outer configuration similar to that of the V-shaped slot 47 and extends into but does not completely fill the slot. Insert 50 also has a lower projecting member 54 which comprises a thin wall extending between the outer limits of the first upper portion 52. A projecting portion 55 is formed in one surface of the insert to provide a convenient means of grasping the insert for the purpose of insertion into and removal from the cell body. The outer surfaces 56 and 57 which include the outer edges of the lower projecting portion 54 are constructed in such a manner so as to form a small angle $\theta^1$ with the inner faces of side walls 38 and 40 as best illustrated in FIG. 4, for the purpose of reducing the capillary action of the sample from the sample channel. In like manner the outer faces 58 and 59 of V-shaped portion 53 form a small angle with the inner faces of the V-shaped slot 47 as also best illustrated in FIG. 4.

As was the case with the illustrative embodiment of FIG. 1 cell body 37 may be made of any suitable opaque material depending upon the desired type and method of sealing windows 42 and 48 thereto. Likewise, insert 50 is constructed of opaque material and may preferably be black Teflon because of its non-wetting properties which has the advantages of reducing capillary action of the sample between the adjacent surfaces of insert 50 and cell body 37.

In each of the embodiments the V-shaped grooves in the cell body have the advantage that the sample may be introduced into the cell along the V-shaped groove which operates to channel the sample into the aperture 20 of FIG. 1 and 44 of FIG. 3 such that a minimum volume of the sample is necessary because the sample does not tend to collect on the inner surface of the lower side wall. By providing the inserts with a V-shaped projection which matches the V-shaped slot of the cell body the area of sample exposed to the atmosphere is substantially reduced and therefore greatly reduces the evaporation of volatile liquid sample and the possible contamination of the sample from the exterior environment.

As has been previously pointed out it is obvious that the insert may have an overall configuration substantially the same as the cavity although this has the disadvantage of presenting an increased area which is exposed to the sample thereby increasing the tendency of capillary action of the sample between the insert and the cell body. It is also obvious that the V-shaped projecting portions of the insert may be omitted without substantially affecting the desired operation of the cell.

There has been specifically illustrated and described alternative embodiments of micro-volume sample cells constructed after the teachings of this invention. It should be understood that the novelty of this invention is not limited to the specific embodiments illustrated and described but is defined only by the scope of the appended claims.

What is claimed is:

1. A micro-volume sample cell for use in spectroscopic measurements and the like comprising:
   a cell body having a plurality of side walls having inner faces defining a cavity, one of said side walls having an aperture defining a sample channel therein, said aperture extending through adjacent, opposite side walls, each of said adjacent, opposite side walls having a V-shaped slot therein, the narrowed portion of said slot terminating in said aperture and the widened portion terminating at an outer face of said cell body so as to form an opening for filling said sample channel;
   respective transparent sealing means contiguous to the outer face of each of said adjacent opposite side walls and covering at least said aperture, each of said sealing means secured in sealed relation with said side walls;
   and a removable insert having at least a portion having an outer configuration substantially the same as said cavity fitted into said cavity and at least a narrowed projecting portion seating adjacent said one side wall, said projecting portion defining one limit of said sample channel;
   said cell body and said insert being opaque to radiation from the ultra-violet to the near-infrared spectral regions.

2. A micro-volume sample cell for use in spectroscopic measurement and the like comprising:
   a cell body having at least three side walls each having an inner face which together define a portion of a cavity, one of said side walls having an aperture defining a sample channel therein, said channel extending between opposite outer faces of said cell body;
   transparent sealing means contiguous to said opposite outer faces secured in sealed relation therewith and covering said aperture;
   a removable insert fitted into said cavity and seating adjacent said one side wall and defining one limit of said sample channel, said insert having at least a pair of opposite sides forming an acute angle with the inner faces of adjacent side walls for reducing capillary action of a sample within said sample channel;
   said cell body and said insert being opaque over a wide range of radiation whereby said cell body and said insert define the cross-sectional area of radiation passing from a source to a detector through said sample channel.

3. A micro-volume sample cell for spectroscopic measurement and the like comprising:
   a cell block having an aperture therein extending between opposite outer faces and defining a sample channel therein, said cell block further having at least one V-shaped slot having its widened section terminating at one outer face of said block and its narrow section terminating at said aperture so as to provide an opening for filling said sample channel with a sample;
   respective transparent sealing means contiguous to said opposite outer faces and secured in sealed relation therewith, said sealing means covering said aperture;
   said cell block being opaque to radiation over a wide spectral region so as to define the cross-sectional area of radiation passing from a source to a detector through said sample.

4. A micro-volume sample cell for spectroscopic measurement and the like comprising:
   a cell body having three side walls each having an inner face defining three sides of a cavity, one of said side walls having an aperture extending between opposite outer faces of said body and defining a sample channel therein;
   respective transparent sealing means contiguous to said opposite outer faces secured in sealed relation therewith and covering said aperture, the inner face of one of said transparent sealing means forming a substantial portion of the fourth side of said cavity;
   a removable insert having at least a portion having an outer configuration substantially the same as said cavity fitted into said cavity and at least a narrowed portion seating adjacent said one side wall and defining one limit of said sample channel;
   the side wall of said cell body opposite said transparent sealing means having said inner face defining a substantial portion of the fourth side of said cavity having a V-shaped slot therein, the narrowed portion of said slot terminating in said sample channel and the widened portion terminating at one outer face of said cell body so as to form an opening for filling said sample channel;
   said cell body and said insert being opaque over a wide spectral region whereby said sample cell defines the cross-sectional area of radiation passing from a source to a detector through said sample.

5. A micro-volume sample cell for spectroscopic measurement and the like comprising:
   a cell body having five side walls each having an inner face defining five sides of a cavity, one of said side walls having an aperture extending between opposite outer faces of said cell body and defining a sample channel therein, said cell body further having a V-shaped slot in at least one of the side walls defining said opposite outer faces, the widened portion of said V-shaped slot terminating at the edge of said side wall remote from said one side wall and the narrowed portion terminating in said aperture defining said sample channel;
   respective transparent sealing means contiguous to said opposite outer faces secured in sealed relation therewith and covering said aperture and said V-shaped slot;
   a removable insert having at least a portion with an outer configuration substantially the same as said cavity fitted into said cavity and at least a second portion seating adjacent said one side wall and defining one limit of said sample channel, at least said second portion forming a small acute angle with the inner faces of said side walls perpendicular to said opposite outer faces for reducing capillary action of a sample within said sample channel;

said cell body and said insert being opaque over a spectral region from ultra-violet to near-infrared so as to define the cross-sectional area of a beam of radiation passing from a source to a detector through said sample channel.

6. A micro-volume sample cell for samples in the order of 50 microliters for use in spectroscopic analysis and the like comprising:

a cell body having three integrally formed side walls having inner faces defining three sides of a cavity, one of said side walls having an aperture extending between opposite outer faces of said body and defining a sample channel therein, each of said other side walls having an inner face which together define a V-shaped slot extending from one outer face of said cell body to said sample channel;

a first transparent sealing means contiguous to one outer face of said cell body secured in sealed relation therewith and covering said aperture and at least a substantial portion of said V-shaped slot;

second transparent sealing means contiguous to the opposite outer face from said first transparent sealing means secured in sealed relation therewith and covering said aperture, the inner face of said second transparent sealing means forming a substantial portion of the fourth side of said cavity;

a removable insert having at least one portion with an outer configuration substantially the same as said cavity and said V-shaped slot fitted into said cavity and said slot and having a second portion seating adjacent said one side wall, said second portion defining one limit of said sample channel;

said cell body and said insert being opaque over a spectral region from ultra-violet through near-infrared so that said cell defines the cross-sectional area of radiation passing from a source to a detector through said sample.

7. The micro-volume sample cell of claim 6 wherein the opposite outer faces of said insert adjacent said each of said other side walls and said faces defining said V-shaped slot form an acute angle therewith for deterring capillary action of a sample within said sample channel.

8. A micro-volume sample cell for samples having a volume of approximately 100 microliters and providing a sample path of approximately 10 millimeters in length for use in spectroscopic analysis and the like comprising:

a unitary cell body having a plurality of side walls with inner faces defining a cavity, one of said side walls having an aperture opening on its inner face and extending between opposite outer faces of said cell body and defining a sample channel therethrough;

respective transparent silica windows contiguous to said opposite outer faces and fused thereto, said windows covering said aperture;

a removable opaque fluorocarbon resin insert forming a small acute angle with the inner faces perpendicular to said windows fitted into said cavity and seating adjacent said one side wall to define one limit of said sample channel;

said cell body formed of an opaque low expansion glass having the same temperature coefficient as said silica windows.

References Cited

UNITED STATES PATENTS

| | | | |
|---|---|---|---|
| 3,036,215 | 5/1962 | Jones et al. | 88—14 |
| 3,205,764 | 9/1965 | Letter | 88—14 |

JEWELL H. PEDERSEN, *Primary Examiner.*

C. E. QUARTON, *Assistant Examiner.*